United States Patent

[11] 3,590,638

| [72] | Inventor | Harry G. Anastasia<br>Hillsdale, N.J. |
|---|---|---|
| [21] | Appl. No. | 868,492 |
| [22] | Filed | Oct. 22, 1969 |
| [45] | Patented | July 6, 1971 |
| [73] | Assignee | The Bendix Corporation |

[54] THERMOELECTRIC PRESSURE SENSOR
14 Claims, 4 Drawing Figs.

| [52] | U.S. Cl. | 73/398 R |
|---|---|---|
| [51] | Int. Cl. | G01l 9/10 |
| [50] | Field of Search | 73/398, 398<br>C, 15.6, 362, 393 |

[56] References Cited
FOREIGN PATENTS

| 1,297,083 | 5/1962 | France | 73/398 |

*Primary Examiner*—Donald O. Woodiel
*Attorneys*—Peter C. Van Der Sluys and Plant, Hartz, Smith and Thompson ABSTRACT: A pressure sensor having a bimetallic diaphragm that is subjected to a pressure and adapted to flex from a reference contour in response to a change in the pressure. A linear variable differential transformer positioned adjacent to the diaphragm provides a signal corresponding to the displacement of the diaphragm from the reference contour. A thermoelectric device is responsive to the transformer signal for varying the temperature of the diaphragm causing it to return to the reference contour. A temperature probe senses the diaphragm temperature and provides a signal corresponding to the sensed pressure.

INVENTOR.
HARRY G. ANASTASIA

AGENT

INVENTOR
HARRY G. ANASTASIA

THERMOELECTRIC PRESSURE SENSOR

BACKGROUND OF THE INVENTION

1. Field of the Invention

This invention relates to pressure sensors and more particularly to pressure sensors having diaphragms.

2. Description of the Prior Art

Heretofore, one of the major causes of errors in precision pressure sensors was hysteresis and inaccurate temperature compensation. Pressure sensors having flexible parts were subject to hysteresis when any substantial displacement was experienced. Temperature variations caused sensor errors which were compensated by various means; however, none of the compensation means provided exact compensation and sensor errors remained.

SUMMARY OF THE INVENTION

The present invention contemplates a pressure sensor having an accuracy that is unaffected by ambient temperature and is free from hysteresis errors. Hysteresis errors are eliminated because the sensor has a pressure-responsive element that experiences no substantial displacement. The temperature of the pressure-responsive element is controlled to vary directly with pressure thereby eliminating the need for temperature compensation.

The pressure-responsive element comprises a bimetallic diaphragm having a reference contour. The diaphragm forms one wall of an evacuated chamber and is adapted to flex in response to a pressure applied thereto. A linear variable differential transformer is positioned adjacent to the bimetallic diaphragm to form an airgap therebetween. The width of the airgap controls the reluctance of a flux path through the transformer. The transformer provides a signal corresponding to a change in the airgap which in turn corresponds to the displacement of the diaphragm from the reference contour. A thermoelectric device is responsive to the transformer signal for varying the temperature of the bimetallic diaphragm causing it to return to the neutral contour. A temperature probe senses the diaphragm temperature, which corresponds to the pressure, and provides a signal corresponding thereto.

Thus the diaphragm is maintained at the reference contour and does not experience a substantial displacement thereby eliminating hysteresis errors. The temperature of the diaphragm is maintained at a level corresponding to the sensed pressure so the sensor is independent of ambient temperature.

Accordingly it is a broad objective of this invention to provide a sensor that is immune to ambient temperature and free of hysteresis errors.

Another objective is to provide a sensor having no substantially moving parts.

The foregoing and other objectives and advantages of the invention will appear more fully hereinafter from a consideration of the detailed description which follows taken together with the accompanying drawings wherein two embodiments of the invention are illustrated by way of example.

DESCRIPTION OF THE INVENTION

Figure 1:
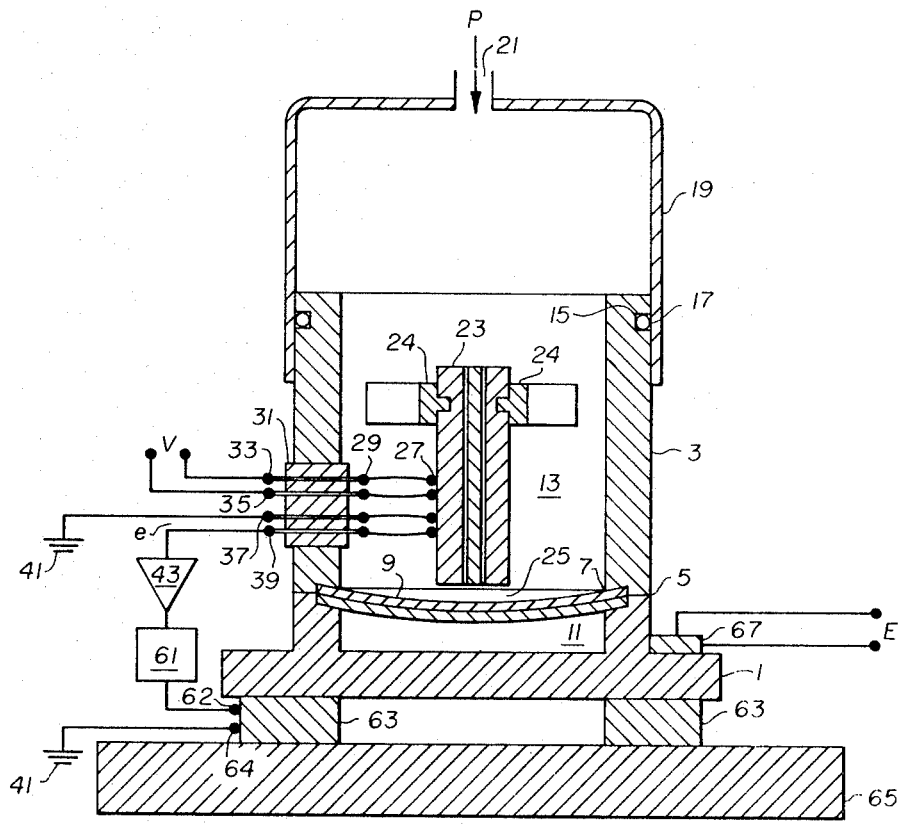
FIG. 1 is a vertical section of a pressure sensor constructed in accordance with the present invention.

Referring to FIG. 1 there is shown a pressure sensor for sensing a pressure P such as static pressure. A lower member 1 has a hollow cylindrical extension that is sealed to one end of a hollow upper cylindrical member 3 along a seam 5. A circular groove 7 is formed along the inner portion of seam 5 for retaining a bimetallic diaphragm 9 which is sealed therein and separates the spaces within members 1 and 3 to form two chambers 11 and 13. The bimetallic diaphragm is constructed from a lamination of two metals having different coefficients of expansion. Upper member 3 has a circular groove 15 formed in an outer wall for receiving a sealing ring 17. A cup-shaped cover 19 is fitted over member 3 and ring 17 which forms a seal therebetween. A port 21 is provided in cover 19 for receiving pressure P which exerts a force on diaphragm 9. Chamber 11 is evacuated so that the only force on diaphragm 9 is that which results from pressure P.

A linear variable differential transformer 23 is adjustably mounted within member 3 by use of a supporting member 24 and is suspended above diaphragm 9 forming an airgap therebetween. Transformer 23 has terminals 27 connected to corresponding inner terminals 29 of a header 31 mounted in the wall of member 3. Header 31 has four outer terminals 33, 35, 37 and 39. Terminals 33 and 35 are connected to an AC voltage source V for excitation of transformer 23. Terminal 37 is connected to ground 41 and terminal 39 is connected to the input of an amplifier 43.

Figure 2:
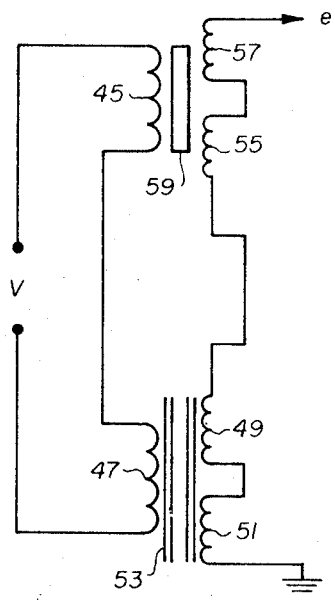
FIG. 2 is a schematic diagram of the transformer shown in FIG. 1.

Referring to FIG. 2 there is shown a schematic diagram of transformer 23. Two primary windings 45 and 47 are connected in series to voltage source V. Two secondary windings 49 and 51 are connected in series and have voltages induces therein dependent upon the reluctance of a magnetic flux path through a core 53. Core 53 is positioned adjacent to diaphragm 9 and airgap 25 is a part of the flux path. The reluctance of the path varies in corresponding relation to the width of the airgap. Two secondary windings 55 and 57 are connected in series with windings 49 and 51 and have voltages induced therein dependent upon the reluctance of a flux path through a core 59. Core 59 has an airgap that is adjusted to set the reluctance of the flux path and thereby vary the voltage induced in windings 55 and 57. Windings 55 and 57 are wound so that the voltages induced therein are of opposite phase from the voltages induced in windings 49 and 51. Transformer 25 provides a signal $e$ that corresponds to the difference between the voltages induced in the two sets of windings. Signal $e$ is provided to amplifier 43 through terminal 39.

Figure 3:
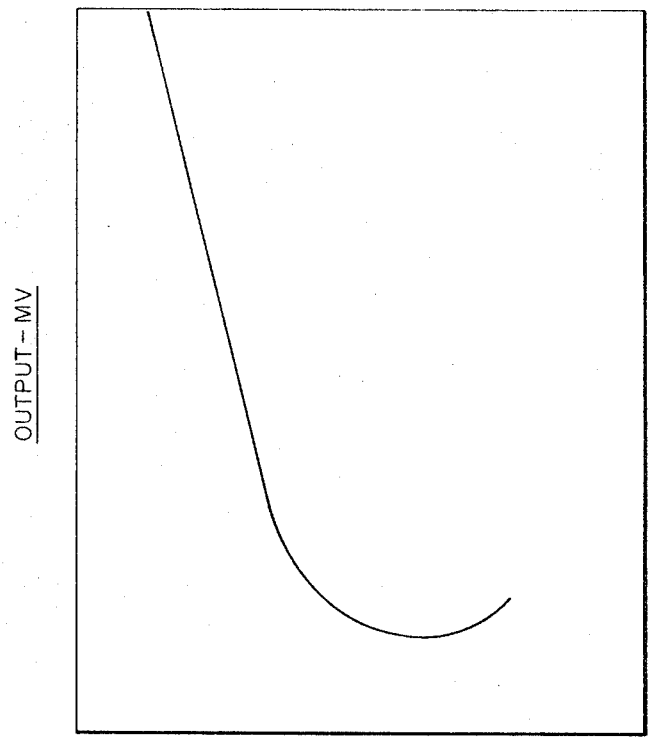
FIG. 3 is a graph showing the output of the transformer of FIG. 2.

Referring to FIG. 3 there is a curve showing the relationship between airgap 25 and the voltage induced in windings 49 and 51. It is desirable to operate in the linear and high-output gradient region of the curve so that voltage changes are appreciable and correspond linearly to airgap changes.

At a reference pressure P and a reference diaphragm temperature airgap 25 is initially adjusted to operate in the linear region of the curve of FIG. 3 by positioning transformer 23. The airgap in core 59 is adjusted so that the voltages induced in windings 55 and 57 exactly cancel the voltages in windings 49 and 51 and signal $e$ is at a null. When the airgap and signal $e$ are so adjusted diaphragm 9 is said to be in a reference contour.

Again referring to FIG. 1 amplifier 43 receives and amplifies signal $e$ and has an output connected to a synchronous demodulator 61 for providing an amplified signal thereto. Demodulator 61 provides a DC signal the polarity of which depends upon the phase of signal $e$. The DC signal is provided to a terminal 62 of a thermoelectric device 63 which is disposed between lower member 1 and a heat sink 65. Thermoelectric device 63 has a terminal 64 connected to ground 41 to complete an electrical circuit. Thermoelectric device 63 is of a type similar to Cambion Model 581-3953-04 manufactured by the Cambridge Thermionic Corporation which employs the Peltier effect to heat or cool member 1 and diaphragm 9 in response to the polarity of the DC signal.

In operation chamber 11 is evacuated and chamber 13 is subjected to pressure P. Diaphragm 9 is flexed from the reference contour in response to a change in pressure P causing the width of airgap 25 to either increase or decrease depending upon the change in pressure P. Assuming a pressure decrease is experienced then airgap 25 decreases causing signal e to increase and be in phase with voltage V. Demodulator 61 in response to the output of amplifier 43 provides a positive DC voltage to thermoelectric device 63 which in response thereto liberates heat thereby raising the temperature of member 1 and diaphragm 9. Diaphragm 9 changes contour in response to the temperature rise and returns to the reference contour thereby nulling signal e. When a pressure increase is experienced airgap 25 increases causing signal e to increase and be out of phase with voltage V. Demodulator 61 in response to the output of amplifier 43 provides a negative DC voltage to device 63 which absorbs heat thereby lowering the temperature of member 1 and diaphragm 9 which returns to the reference contour. Thus the temperature of diaphragm 9 and member 1 corresponds to pressure P, and diaphragm 9 never experiences a substantial change in contour.

A temperature probe 67 is mounted on member 1 to sense the temperature thereof and to provide a signal E corresponding thereto. Said signal E also corresponds to pressure P.

The invention is adaptable for sensing pressure differentials by subjecting chamber 11 to one pressure, such as static pressure and chamber 13 to a second pressure such as total pressure. With such an arrangement signal E corresponds to the difference between the first and second pressures.

Figure 4:
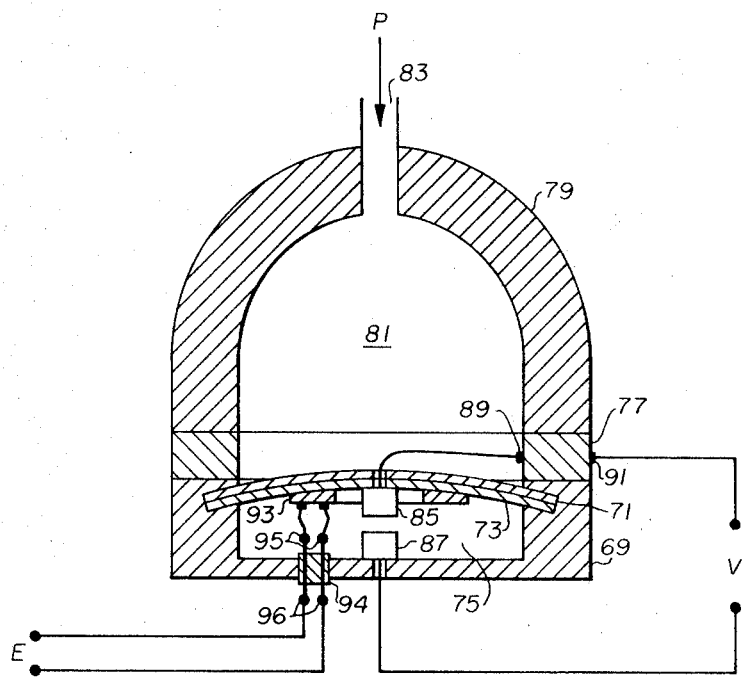
FIG. 4 is a vertical section of a second embodiment of the pressure sensor taught by the present invention.

A second embodiment of the invention is shown in FIG. 4. A lower hollow cylindrical member 69 having one closed end has a circular groove 71 formed in an inner wall for receiving and retaining a bimetallic diaphragm 73 similar to the diaphragm in FIG. 1 which is sealed therein. Diaphragm 73 forms a sealed chamber 75 in member 69 which is evacuated. A cylindrical heating element 77 is sealed between member 69 and a dome-shaped member 79 which forms an upper chamber 81. Member 79 functions as a heat sink to bias diaphragm 73 and heater 77 to cooling. Member 79 has a port 83 for receiving a pressure P to be sensed.

A pair of contacts 85 and 87 are arranged within chamber 75, for making contact when diaphragm 73 is flexed downward by an increase in pressure P. Contact 85 is connected to but insulated from diaphragm 73 and contact 87 is connected to member 69 but insulated therefrom. When diaphragm 73 is in a reference contour at a reference temperature, pressure contacts 85 and 87 are adjusted to open. Contact 85 is connected to a terminal 89 of heater 77. A voltage V is connected across a terminal 91 on heater 77 and contact 87 for energizing heater 77 when contacts 85 and 87 are closed.

A temperature probe 93 is fixed to diaphragm 73 for sensing the temperature of the diaphragm and for providing a signal E corresponding thereto. A header 94 is mounted in a portion of member 69 and has inner terminals 95 for receiving signal E and outer terminals 96 for providing signal E outside of sealed chamber 75.

In operation an increase in pressure P causes diaphragm 73 to flex downward causing contacts 85 and 87 to complete an electrical circuit to heater 77 which in response to voltage V heats diaphragm 73. In response to heating diaphragm 73 changes contour upward and returns to the reference contour opening contacts 85 and 87. Thus diaphragm 73 is heated to a temperature sufficient to neutralize pressure P. When pressure P is decreased diaphragm 73 flexes upward and the cooling provided by member 79 reduces the temperature of the diaphragm causing the contour to change back to the reference contour. Temperature probe 93 provides a signal E corresponding to pressure P. It is to be understood that any form of heat transfer means may be used to bias the diaphragm to cooling.

In a manner similar to that used with the embodiment of FIG. 1 this embodiment can also be adapted to sense pressure differentials by providing a second pressure to chamber 75.

Thus the present invention provides a pressure sensor that is maintained at controlled temperatures thereby making the sensor immune to ambient temperature changes. The sensor has no moving parts that are subject to failure or wear. Hysteresis errors are eliminated by restricting diaphragm flexure to an insignificant amount.

What I claim is:
1. A device for measuring pressure comprising:
   a diaphragm adapted to flex when subjected to changes in pressure and changes in temperature;
   means for subjecting the diaphragm to the pressure to be measured so that the diaphragm flexes from a reference contour with changes in pressure;
   heat transfer means associated with said diaphragm and arranged in heat transfer relationship therewith to restore the diaphragm to its reference contour; and
   means for detecting the temperature of the diaphragm and providing an output corresponding to the pressure to be measured.

2. A device for measuring pressure as described in claim 1, which includes means for detecting flexure of the diaphragm from the reference contour for controlling the heat transfer means.

3. A device for measuring pressure as described in claim 2, in which the means for detecting diaphragm flexure provides a signal corresponding thereto.

4. A device for measuring pressure as described in claim 2, in which the means for detecting flexure of the diaphragm is an inductive device.

5. A device for measuring pressure as described in claim 3, in which the means for measuring the flexure of the diaphragm comprises a linear variable differential transformer positioned adjacent the diaphragm and spaced therefrom to provide an airgap which varies, with flexure of the diaphragm from the reference contour, said transformer having a flux path through the airgap and the diaphragm so that the flux varies with diaphragm flexure.

6. A device for measuring pressure as described in ciaim 2, in which the means for detecting flexure of the diaphragm is a pair of switch contacts for controlling the heat transfer means.

7. A device for measuring pressure as described in claim 1, in which the heat transfer means heats the diaphragm for flexing the diaphragm in one direction and cools the diaphragm for flexing the diaphragm in the opposite direction when the diaphragm is flexed from the reference contour by a change in pressure.

8. A device for measuring pressure as described in claim 1, in which the diaphragm is subjected to different pressures at opposite sides thereof and the device provides an output corresponding to the difference in pressures.

9. A device for measuring pressure as described in claim 8, in which one of the pressures is a vacuum and the output corresponds to the absolute value of the other pressure.

10. A device for measuring pressure as described in claim 6, wherein the heat transfer means comprises:
   means for biasing the diaphragm to cooling;
   heating means connected to the switch contacts; and
   a power source connected to the switch contacts, said switch contacts responsive to one sense of diaphragm flexure to connect the power source to the heating element which is responsive to the power to heat the diaphragm so that it returns to the reference contour.

11. A device as described in claim 1, wherein the heat transfer means comprises a thermoelectric device.

12. A device as described in claim 1, wherein the diaphragm is bimetallic.

13. A device as described in claim 2, wherein the heat transfer means comprises:
   means for biasing the diaphragm to cooling; and
   heating means responsive to one sense of diaphragm flexure for heating the diaphragm so that it returns to the reference contour.

14. A method for measuring pressure comprising the steps of:
   subjecting a heat-sensitive diaphragm to a pressure to be measured to flex the diaphragm from a reference contour;
   changing the temperature of the diaphragm to restore the diaphragm to the reference contour; and
   measuring the temperature of the diaphragm to provide a measure of the pressure.